May 18, 1965    G. D. LEGGE    3,183,740
HOLDING MEANS FOR A MOVABLE OPERATING MEMBER
Filed Oct. 4, 1962    2 Sheets-Sheet 1
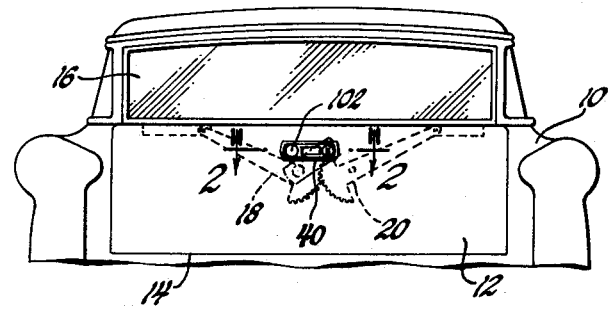
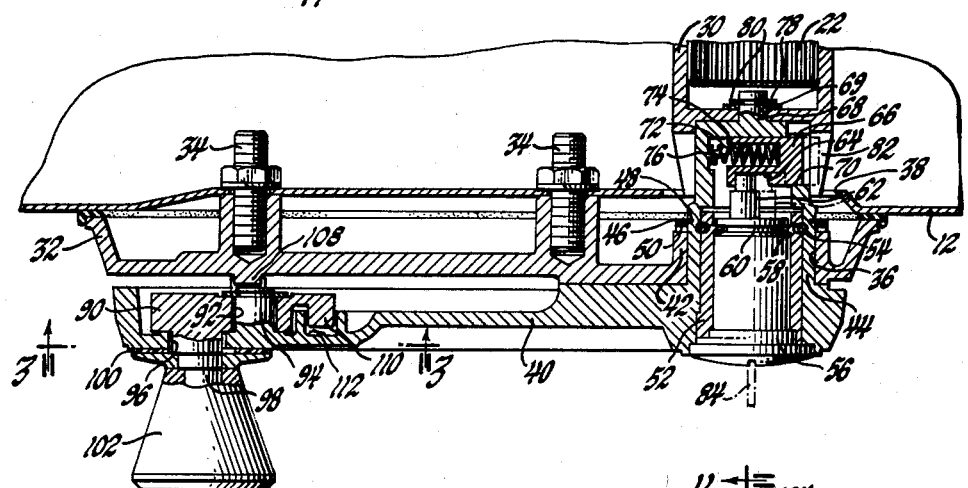
INVENTOR.
George D. Legge
BY
Paul J. Ellington
ATTORNEY May 18, 1965    G. D. LEGGE    3,183,740
HOLDING MEANS FOR A MOVABLE OPERATING MEMBER
Filed Oct. 4, 1962    2 Sheets-Sheet 2
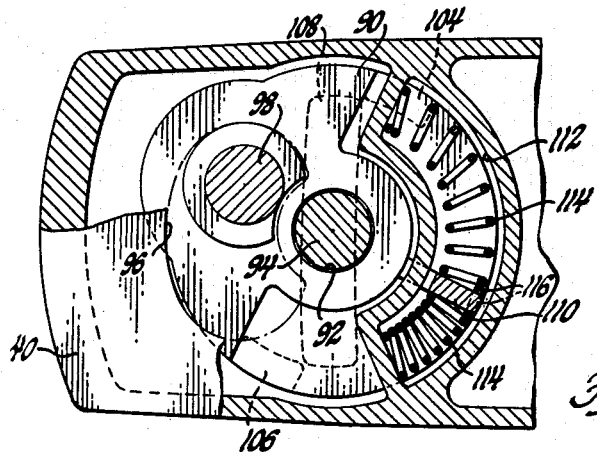
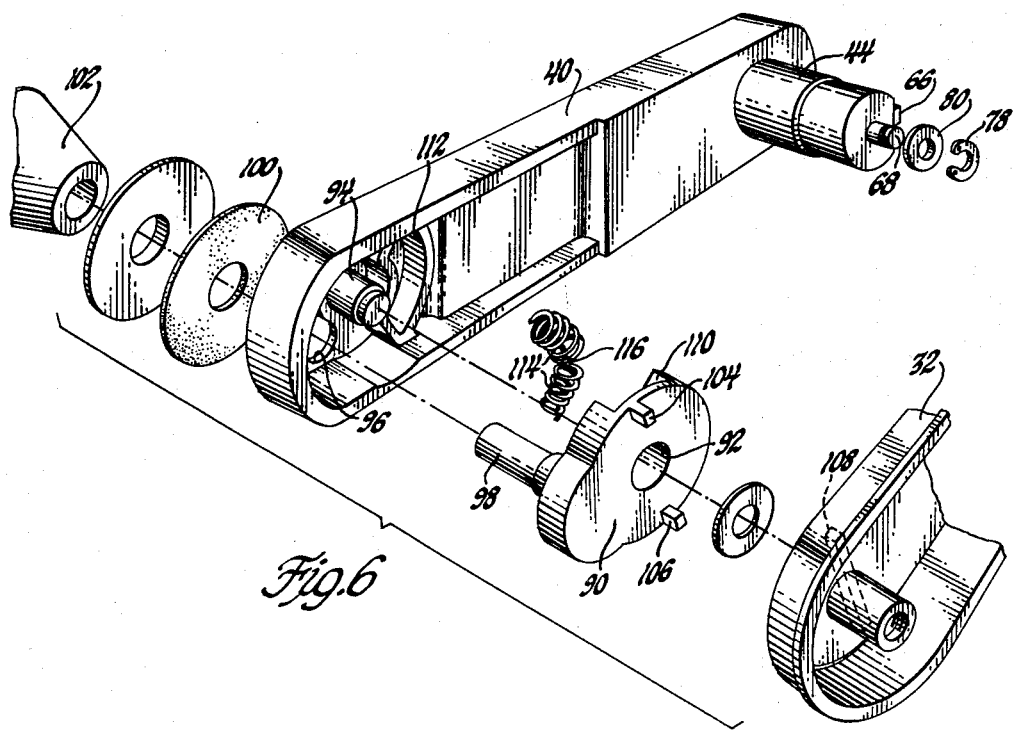
INVENTOR.
George D. Legge
BY
Paul J. Ethington
ATTORNEY

United States Patent Office 3,183,740
Patented May 18, 1965

3,183,740
HOLDING MEANS FOR A MOVABLE OPERATING MEMBER
George D. Legge, Farmington, Mich., assignor to General Motors Corporation, Detroit, Mich., a corporation of Delaware
Filed Oct. 4, 1962, Ser. No. 228,463
5 Claims. (Cl. 74—545)

This invention relates to detent means and more particularly to a novel detent means for locking a movably mounted operating member to a supporting member in a desired position.

Applications may arise wherein it is desirable that an operating member which is movably mounted to a support member be locked in a desired position with respect to the support member. One such application is an operating member in the form of a crank handle rotatably mounted on the exterior of a station wagon tailgate and connected with a vehicle window regulator mechanism for operating the mechanism. From a styling viewpoint it may be desirable that after the tailgate window is cranked to its desired position that the crank handle be locked in some desired position, such as vertical or horizontal, with respect to the tailgate. Another desirable reason for locking the crank handle in a position with respect to the tailgate is to prevent the handle from swinging freely about its axis of rotation when not in an operative condition, which under certain road conditions may result in objectionable noises if the handle rattles against its support member.

In accordance with this invention, a novel detent means is provided for locking an operating member in a desired position with respect to a support member to which it is movably mounted. The detent means includes a detent control member slidably mounted to the operating member for movement to first and second positions. The control member and the support member are each provided with locking means adapted to maintain the control member locked to the support member when the control member is in the first position. Resilient means are provided to normally bias and maintain the control member in the first position. Accordingly, when the control member is in the first position and the first locking means is received by the second locking means the operating member is locked to the support member. Furthermore, when the control member is urged toward the second position with sufficient force to overcome the resilience of the resilient means the operating member is unlocked, permitting movement thereof. The invention is particularly adapted for use in conjunction with a station wagon tailgate window regulating mechanism and an operating member for operating the mechanism wherein it is desirable that the operating member be locked in a particular position with respect to the tailgate when the operating member is in a non-operative condition.

A more complete understanding of this invention may be had from the detailed description which follows taken with the accompanying drawings in which:

FIGURE 1 is a partial rear elevation view of a station wagon body embodying detent means according to this invention;

FIGURE 2 is an enlarged, partially broken away plan view of the detent means and is taken along lines 2—2 in FIGURE 1 looking in the direction of the arrows;

FIGURE 3 is an enlarged sectional view taken along lines 3—3 in FIGURE 2 looking in the direction of the arrows and illustrating the detent means in a locked position;

FIGURE 4 is an enlarged section view taken along lines 4—4 in FIGURE 3 looking in the direction of the arrows;

FIGURE 5 is identical to FIGURE 3 but illustrating the detent means in an unlocked position; and FIGURE 6 is an exploded perspective view of the detent means.

Referring now to the drawings, and more particularly to FIGURE 1, there is shown a station wagon body 10 including a tailgate 12 which is swingably mounted on the body at its lower edge 14 for movement between a closed position, as shown, and an open position wherein the tailgate is disposed in a generally horizontal position. The tailgate 12 supports a window 16 which is movable between a closed position, as shown, and an open position within the tailgate, not shown. The window 16 is moved between open and closed positions by a window regulator mechanism which includes a pair of lift arms 18 and 20 and means, not shown, connecting the lift arms with a window regulator drive spindle comprising a rotatable shaft 22 splined at one end to a clutch member 30 (see FIGURE 2).

As shown in FIGURES 1 and 2 of the drawings, a rectangular shaped escutcheon 32 is mounted to the exterior of the tailgate 12 by suitable means 34. The escutcheon 32 is provided with a circular aperture 36 coaxial with a circular aperture 38 of larger diameter in the tailgate 12. The escutcheon 32 includes a hollow cylindrically shaped hub 42 which surrounds the aperture 36. A window regulator crank handle 40 seats against the outer end of hub 42 and includes a hollow cylindrical shaped hub 44 rotatably received within hub 42 and fixed against axial outward movement therefrom by means of a split ring 46 which is received within a groove 48 of hub 44 and bears against a washer 50 located between the split ring and the inner end of hub 42. A lock cylinder housing 52 is received within the hub 44 of handle 40 and is held in place therein with an annular retaining ring 54 interposed between the hub 44 and the housing 52. A lock cylinder 56 is received within housing 52 and is fixed against axial outward movement from the housing 52 by means of an annular flange 58 extending radially inward from the housing 52 and received by an annular groove 60 in the lock cylinder 56.

The lock cylinder 56 includes a lug 62 which is eccentrically located with respect to the axis of rotation thereof and is received within a slot 64 of a locking pawl 66. The pawl 66 is slidably mounted on one end of an axial lug 68 which protrudes through an aperture 69 in the base of the clutch member 30. The pawl 66 is continually urged radially outward through a slot 70 in the hub 44 by means of a coil compression spring 72 which is received within a bore 74 of the pawl 66 and seats on a lug 76 protruding from the hub 44.

The clutch member 30 is mounted on the inner end of hub 44 and is rotatably secured thereto by means of a split ring 78 which is received within a groove provided in the axial lug 68. A washer member 80 is provided between the split ring 78 and the base of the clutch member 30. The clutch member 30 is also provided with an axial slot 82 which is adapted to receive the lock pawl 66.

If the operator now inserts a suitable key 84 into the lock cylinder 56 and turns it clockwise approximately 90°, looking upwards in FIGURE 2, the lug 62 will be displaced to the position shown by the dotted lines. Thus, the pawl 66 will be displaced radially outward by means of the compression spring 72 to a clutched position indicated by the dotted lines shown in FIGURE 2 so as to be received by the slot 82 in the clutch member 30. With the pawl 66 received in the slot 82, the clutch member 30 provides driving engagement between the handle 40 and the window regulating mechanism via the rotatable shaft 22. If the operator now turns the key 84 so as to return the lug 62 and the pawl 66 to the positions shown by the solid lines in FIGURE 2, then the clutch member 30 will be locked in its declutched position so as to thereby maintain the handle 40 and the window regulating mechanism in disconnected relationship.

In accordance with this invention, detent means are provided for locking the handle 40 to the escutcheon 32 in a horizontal position as shown by the solid lines in FIGURE 1. As best shown in FIGURES 3, 4, 5 and 6, the detent means comprises a detent control member 90 having a circular aperture 92. The handle 40 is provided with a cylindrically shaped pivot post 94 protruding therefrom to which the control member 90 is pivotally mounted at the aperture 92. The handle 40 has formed therein an arcuate recess or slot 96 radially disposed from the pivot post 94. The control member 90 is provided with a stud member 98 protruding therefrom and received by the slot 96 in the handle 40. The walls of the slot 96 act as a guide and stop members for guiding and limiting arcuate movement of the control member 90 in the slot. The slot 96 permits arcuate movement of the control member 90 to first and second positions at the respective extremes of the slot and to a third position midway therebetween. A knob 102 is suitably mounted to the end of the stud member 98 via a washer 100 for facilitating operation of the control member 90 and of the handle 40.

The control member 90 has formed thereon a pair of spaced pawl members 104 and 106 located diametrically opposite each other and 90° from the stud member 98 with respect to the aperture 92 and protrude in a direction opposed to that of the stud member 98. The escutcheon 32 is provided with a substantially rectangular shaped abutment member 108 protruding therefrom and adapted to receive the pawl members 104 and 106 of the control member 90 in locked engagement when the control member is in the third position. The control member 90 is provided with a tab member 110 protruding from the periphery thereof and located diametrically opposite the stud member 98 with respect to the aperture 92. The handle 40 has formed thereon an arcuate guide channel 112 which receives the tab member 110. A coil spring 114 having an uncoiled portion 116 in the center thereof with equal number of convolutions on each side is compressively fitted into the guide channel 112 and is held in place with the tab member 110 which bears against the uncoiled portion 116. The spring 114 serves to center the tab 110 between the extremes of the guide channel 112 so as to thereby normally bias and maintain the control member 90 in the third position.

If the operator desires to lock the handle 40 to the escutcheon 32 he merely grasps the knob 102 and rotates the handle 40 about the axis of the lock cylinder 56 until the pawls 104 and 106 of the control member 90 are in approximate alignment with the abutment member 108 of the escutcheon 32. The knob 102 is then released and the spring 114 acts to bias the control member 90 to its third position whereby the pawl members 104 and 106 are received by the abutment member 108 in locked engagement as shown in FIGURE 3. To unlock the handle 40, the operator merely grasps the knob 102 and pivotally displaces the control member toward either the first or second position against the tension of the spring 114 so that the tab member compresses one side of the spring and stretches the other side of the spring as shown in FIGURE 5. Thus, the pawl members 104 and 106 are rotatably displaced from the abutment member 108 thereby unlocking the handle member 40. If the operator continues to pivotally displace the control member 90 about the pivot post 94 in the same direction with which he unlocked the handle 40 the stud member 98 will engage one end of the arcuate slot 96 to thereby provide a driving connection between the handle 40 and the control member 90 and thus permit rotational movement of the handle 40 to operate the window regulator mechanism.

While this invention has been described with respect to a particular embodiment, it is not to be construed in a limiting sense. Numerous variations and modifications within the spirit and scope of the invention will now occur to those skilled in the art. For a definition of the invention, reference is made to the appended claims.

I claim:

1. In combination with an operating member movably mounted relative to a support member, means for locking the operating member in a desired position with respect to the support member and comprising a control member mounted by the operating member for movement between first and second positions, the control member including first locking means, the support member being provided with a second locking means engageable with the first locking means to lock the operating member in the desired position when the control member is in its first position, said locking means being disengageable when the control member is actuated to its second position thereby releasing the operating member for movement, resilient means interposed between the control member and the operating member and normally biasing and maintaining the control member in its first position wherein the first locking means is normally conditioned to engage the second locking means and thereby lock the operating member in the desired position relative to the support member, and said operating member having a recess therein adapted to receive and guide movement of the control member and forming a stop engageable to limit movement of the control member when urged toward its second position with sufficient force to overcome the resilience of the resilient means, thereby releasing the operating member for movement relative to the support member, and providing a driving connection between the operating member and the control member effecting subsequent movement of the operating member.

2. In combination with an operating member movably mounted relative to a support member, means for locking the operating member in a desired non-operating position with respect to the support member and comprising a control member mounted by the operating member for movement between first and second positions, the support member including a first locking means, a second locking means carried by the control member and engageable with the first locking means to lock the operating member in the desired non-operating position when the control member is in its first position, said first and second locking means being disengageable upon actuation of the control member to its second position thereby releasing the operating member for movement, resilient means interposed between the control member and the operating member and normally biasing and maintaining the control member in its first position wherein the first locking means is normally conditioned to engage the second locking means thereby locking the operating member in the desired non-operating position relative to the support member, and said operating member having a stop thereon engageable to limit movement of the control member toward its second position against the resilient means thereby sequentially releasing the operating member and providing a driving connection permitting the control member to effect subsequent movement of the operating member relative to the support member.

3. In combination with an operating chamber rotatably mounted relative to a support member and drivingly connectable with a vehicle window regulating mechanism, means for locking the operating member in a desired non-operative position with respect to the support member, said locking means comprising a control member pivotally mounted on the operating member for swinging movement between first and second extreme positions and a third position intermediate the first and second positions, the control member including a first locking means, the support member being provided with a second locking means normally engageable by the first locking means to lock the operating member in the desired non-operative position when the control member is in its intermediate third position, said locking means being disengaged by pivotal movement of the control member to either of its extreme positions thereby releasing the operating member for window regulating movement, resilient means interposed between the control member and the operating member normally biasing and maintaining the control member in its intermediate third position thereby conditioning the first locking means to engage the second locking means and thereby lock operating member in its desired non-operative position relative to the support member, and said operating member including spaced opposing stops engageable to limit swinging movement of the control member toward either of its first or second extreme positions against the biasing action of the resilient means, thereby sequentially releasing the operating member and providing a driving connection permitting the control member to effect subsequent rotational movement of the operating member.

4. In combination with an operating member rotatably mounted relative to a support member and drivingly connectable to operate an associated mechanism and particularly a vehicle window regulating mechanism, means for locking the operating member in a desired position with respect to the support member and comprising a control member pivotally mounted on a pivot post protruding from the operating member for swinging movement between first and second extreme positions and a third position intermediate the first and second positions, the control member having a pair of spaced pawls protruding therefrom, the support member having an abutment protruding therefrom and engageable with said pawls to lock the operating member in its desired position relative to the support member when the control member is in its intermediate third position, spring means interposed between the control and operating members and normally biasing and maintaining the control member in its intermediate third position thereby tending to engage the control member pawls with the support member abutment and thereby lock the operating member relative to the support member, and said operating member having an arcuate slot therein radially disposed from the pivot post and adapted to receive and guide a protruding portion of the control member and forming opposing stops alternately engageable to limit swinging movement of the control member toward either of its first or second extreme positions against the opposing resilience of the spring means, thereby releasing the operating member and subsequently providing a driving connection permitting further movement of the control member to effect rotational movement of the operating member.

5. The combination set forth in claim 4 further including clutch means interposed between the associated window regulating mechanism and the operating member, said clutch means being selectively operable and alternately movable between clutched and declutched positions alternately connecting the operating member to operate the mechanism or disconnecting the operating member from the mechanism and allowing the operating member to be moved independently thereof to its desired position relative to the support member thereby permitting locking engagement to be effected between said spaced pawls and abutment by pivotal movement of the control member against the biasing action of the spring means.

References Cited by the Examiner
UNITED STATES PATENTS

| | | | |
|---|---|---|---|
| 1,207,490 | 12/16 | Brooks | 74—551 X |
| 1,830,840 | 11/31 | Kienzle | 74—491 |
| 2,545,988 | 3/51 | Brobrick | 74—504 X |
| 2,898,139 | 8/59 | Goodfellow | 292—336.3 |
| 2,899,228 | 4/59 | Polchinski et al. | 292—336.3 X |
| 2,917,942 | 12/59 | Jarrett et al. | 74—504 |
| 3,020,076 | 2/62 | Biondo | 292—336.3 |
| 3,093,368 | 6/63 | West | 74—547 X |

BROUGHTON G. DURHAM, *Primary Examiner.*

UNITED STATES PATENT OFFICE
CERTIFICATE OF CORRECTION

Patent No. 3,183,740                                            May 18, 1965

George D. Legge

It is hereby certified that error appears in the above numbered patent requiring correction and that the said Letters Patent should read as corrected below.

Column 4, line 61, for "chamber" read -- member --.

Signed and sealed this 16th day of November 1965.

(SEAL)
Attest:

ERNEST W. SWIDER
Attesting Officer

EDWARD J. BRENNER
Commissioner of Patents